United States Patent [19]
Spencer

[11] 3,917,000
[45] Nov. 4, 1975

[54] HORSESHOE MANUFACTURE

[76] Inventor: Dudley W. C. Spencer, 619 Shipley Road, Wilmington, Del. 19809

[22] Filed: Dec. 20, 1973

[21] Appl. No.: 426,446

Related U.S. Application Data

[63] Continuation-in-part of Ser. No. 252,546, May 12, 1972, Pat. No. 3,782,473, which is a continuation-in-part of Ser. No. 71,121, Sept. 10, 1970, Pat. No. 3,664,428.

[52] U.S. Cl. .............................. 168/4; 168/DIG. 1
[51] Int. Cl.² ........................................ A01L 1/00
[58] Field of Search ............. 168/4, DIG. 1, 12, 13, 168/14, 17, 20

[56] References Cited
UNITED STATES PATENTS

| | | | |
|---|---|---|---|
| 2,705,536 | 4/1955 | Phreaner | 168/DIG. 1 |
| 3,302,723 | 2/1967 | Renkenberger et al. | 168/DIG. 1 |

Primary Examiner—Robert Peshock
Assistant Examiner—J. Q. Lever
Attorney, Agent, or Firm—Connolly and Hutz

[57] ABSTRACT

A horseshoe assembly includes a shoe element having a bottom member with adhesive means applied thereto. Elongated strands are threaded through holes in the horse's hoof for direct contact with the adhesive means so as to facilitate the shoe adhering to the hoof.

32 Claims, 8 Drawing Figures

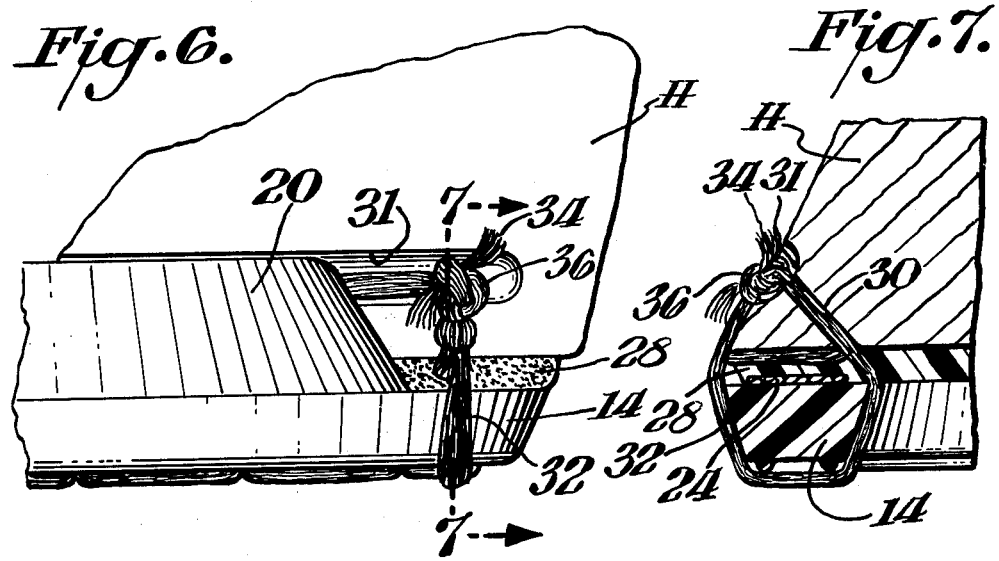

HORSESHOE MANUFACTURE

CROSS-REFERENCE TO RELATED APPLICATION

This application is a continuation-in-part of Ser. No. 252,546; filed May 12, 1972, now U.S. Pat. No. 3,782,473 which in turn is a continuation-in-part of Ser. No. 71,121; filed Sept. 10, 1970 and now U.S. Pat. No. 3,664,428 issued May 23, 1972. The disclosures of said parent application and said parent patent are incorporated herein by reference thereto.

BACKGROUND OF THE INVENTION

U.S. Pat. No. 3,664,428 relates to certain improvements in the manufacture of horseshoes and parent application U.S. Pat. No. 3,782,473 relates to modifications thereof wherein horseshoes are secured to the hoof by thermo-adhesvie means with the utilization of heat conductive elements for quickly melting the thermo-adhesive means. Although both of said parent cases provide advantageous arrangements it is still desirable to provide still other means for quickly and conveniently securing a shoe to a hoof. As indicated in the parent applications, the wear member of the shoe is advantageously made of a plastic material such as elastomeric urethanes including adiprene or other organic plastic wear surface materials including rubber. One of the difficulties with the use of such material, however, is in causing the adhesive to adhere to the shoe member made of such plastics.

SUMMARY OF THE INVENTION

An object of this invention is to provide modifications for mounting a shoe to a hoof by the use of thermo-adhesive means and a heat conductive member.

An additional object of this invention is to provide means for securely causing the adhesive to adhere to the plastic shoe member or shoe element even where a non-thermo-adhesive is used.

A further object of this invention is to provide improvements in horseshoe manufacture wherein the shoe may be quickly and conveniently mounted on the hoof without injury to the horse.

In accordance with this invention a horseshoe assembly includes a shoe element having a bottom member with thermo-adhesive means applied thereto. Heat conductive strands are threaded through holes in the horse's hoof for direct contact with the thermo-adhesive means so as to cause the thermo-adhesive means to melt to thereby cause the shoe to adhere to the hoof.

In accordance with a further aspect of this invention cold bonding may be used instead of a thermo-adhesive whereupon the strands need not be conductive. The strands, however, facilitate a securement of the shoe to the hoof by the inner action of the adhesive with the strands.

Upstanding wall portions may be provided on the shoe element with adhesive means thereon so that the strands are contacted at both the bottom and sides of the hoof.

In accordance with a further aspect of this invention a sheet member having mechanical grabbing means such as velcro pads are provided on the shoe element so that the hook-like structure of the velcro will engage the strands. Other suitable sheet members may also be used provided the members include an impervious support layer and some means on one side thereof for integral securement with the material. Suitable sheet materials are natural hides, leather, fur, suedes or chamois as well as napped Corfam (registered trademark of E. I. du Pont de Nemours & Co.) or other polymerics or stretch fabrics such as knits provided with a barrier.

THE DRAWINGS

FIG. 6 is a side view in elevation of a portion of a horseshoe assembly in accordance with a further aspect of this invention;

FIG. 7 is a cross-sectional view taken through FIG. 6 along the lines 7—7; and

DETAILED DESCRIPTION

Figure 3:
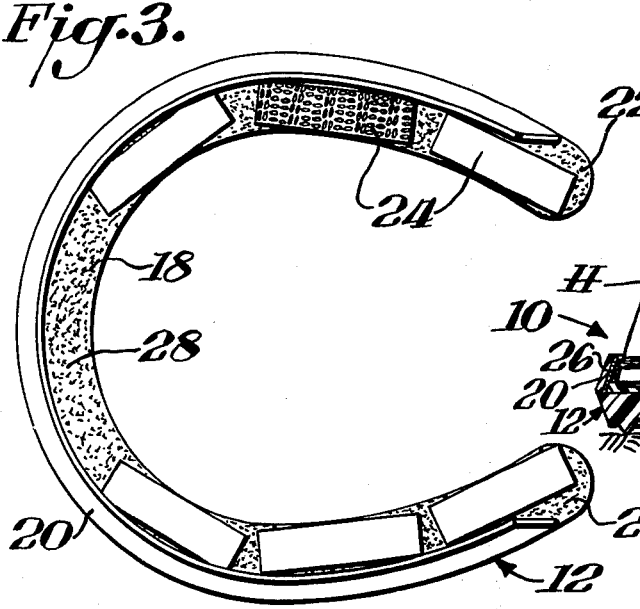
FIG. 3 is a top plan view of the shoe element utilized in FIGS. 1–2.

This application incorporates by reference thereto the disclosures in the previously noted parent applications. For the sake of simplicity the following description will be primarily directed to departures from the procedures disclosed in the parent applications.

The drawings illustrate a horseshoe assembly 10 which includes a shoe element 12 made of any suitable material such as adiprene or such as disclosed in the parent applications and which has a bottom member 14 with a lower wear surface 16 and an upper securing surface 18. Upstanding wall portions 20 such as a continuous wall or wall segments extend from the bottom member for being disposed above the lower surface of the horse's hoof H. Shoe element 12 is generally U-shaped with a pair of free ends 22, 22.

Figure 2:
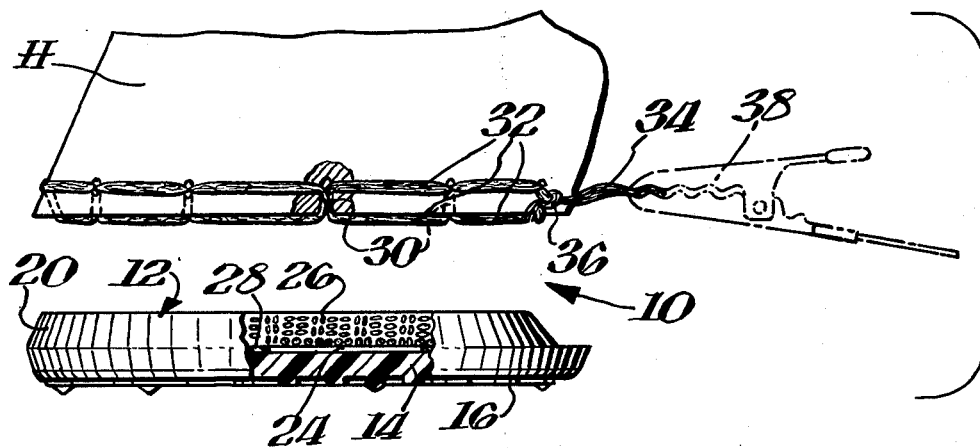
FIG. 2 is an exploded view of the assembly of FIG. 1 showing the application of heat thereto.
Figure 4:
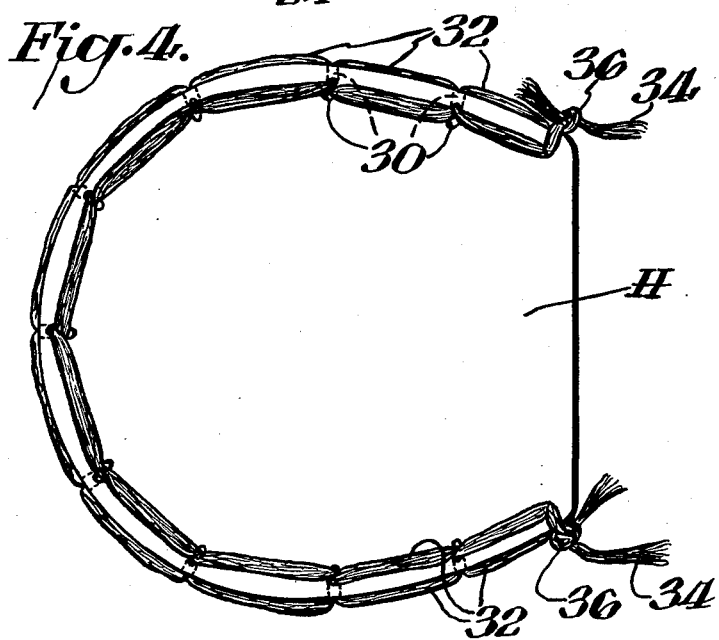
FIG. 4 is a bottom plan view of the horse's hoof employing the strands shown in FIGS. 1–2.

In accordance with one aspect of this invention a sheet member or pad having mechanical anchoring means or projections is provided on the shoe element. Such a sheet member may, for example, be velcro pads having loops or hooks on both sides of an impermeable base or sheet. The term velcro is an art accepted term for structure which includes a plurality of loops or hook-like elements conventionally used as detachable securing means. It is to be understood that other means or sheet materials may also be employed. Preferred materials include natural hides, leather, fur, suedes or chamois. For example a conventional chamois cloth may be buffed to create roughened projections thereon. Other preferred materials include napped Corfam (registered trademark of E. I. du Pont de Nemours & Co.) or other polymerics, still other preferred materials include stretch fabrics (knit) provided with a barrier. The sheet material likewise might be single or double-sided coated fabrics or may be fabric construction with an impermeable membrane or may be double or single-sided velcro tape or may be films or solid sheet adhesives. It has been found, for example, that a nitrile type adhesive sticks sufficiently to the adiprine material to thereby secure the carrier sheet to the adiprine or plastic member whereupon the opposite side of the carrier sheet may have applied thereto an adhesive which would firmly adhere to the hoof and/or the strand material as later described. Accordingly, the primary consideration for the sheet material is that one side thereof have securing means which react with the plastic material so as to be operatively integral therewith. As previously noted, although mechanical means such as projections are quite effective, the securing means may be a suitable adhesive. A further consideration is that the sheet member have an impermeable layer so that the adiprine or other plastic material will not work its way to the other side of the sheet member which will thus interfere with the securing action of the adhesive between the hoof and sheet member. If desired, the other side of the sheet member may also have mechanical elements such as projections to act as anchoring means for the hoof securing adhesive. The pad with its anchoring projections may be applied in various manners. For example, FIG. 3 illustrates a plurality of spaced pads 24 being arranged on the upper securing surface 18. FIG. 2 illustrates a continuous U-shaped pad 26 being arranged on the upstanding wall 20. It is to be understood, of course, that the pads need not be applied to both the bottom member and the wall portions although it is preferable to do so or that the pads may be applied in spaced pads or a single continuous pad to either or both the bottom member and the wall portion. The invention may also be practiced by having the pads 24, 26 integrally formed as part of a single sheet member which takes the same general shape as the bottom member 14 and upstanding wall 20 of shoe element 12.

Figure 5:
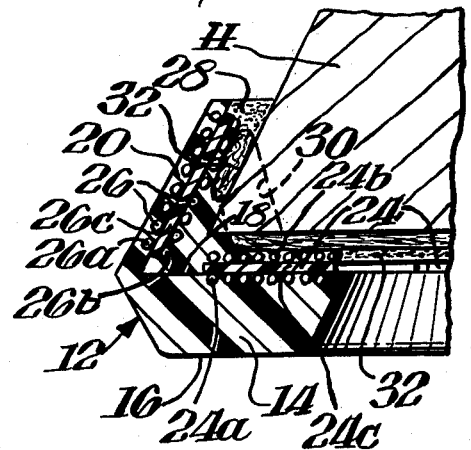
FIG. 5 is a cross-sectional view taken through FIG. 1 along the line 5—5.

As later described the pads 24, 26 are applied to the plastic shoe element 12 in such a manner that the projections 24a, 26a become embedded in the plastic material so as to function as an integral unit as illustrated, for example, in FIG. 5. Adhesive means 28 such as thermo-adhesive is then applied over the pads 24, 26 and are firmly secured to the projections or anchoring means 24b, 26b on the opposite side of the sheet member 24c, 26c. The pads 24, 26 thus function to provide an effective means of securement of the adhesive to the shoe member by utilizing the integral anchoring of the projections 24a, 26a with the plastic shoe member and in turn the anchoring means or projections 24b, 26b for securement of the adhesive. Thus whereas the prior art would have difficulty securing an adhesive directly to a plastic material such as adiprene, with the inventive arrangement the adhesive is secured to the pad and the pad is secured to the plastic material.

Various horseshoe designs may be used. Thus, for example, the body member may have a web portion which shields the frog of the horse's foot. In such case the sheet material or pads 24, 26 would be of generally a U-shape and would not be disposed against the web portion.

Figure 8:
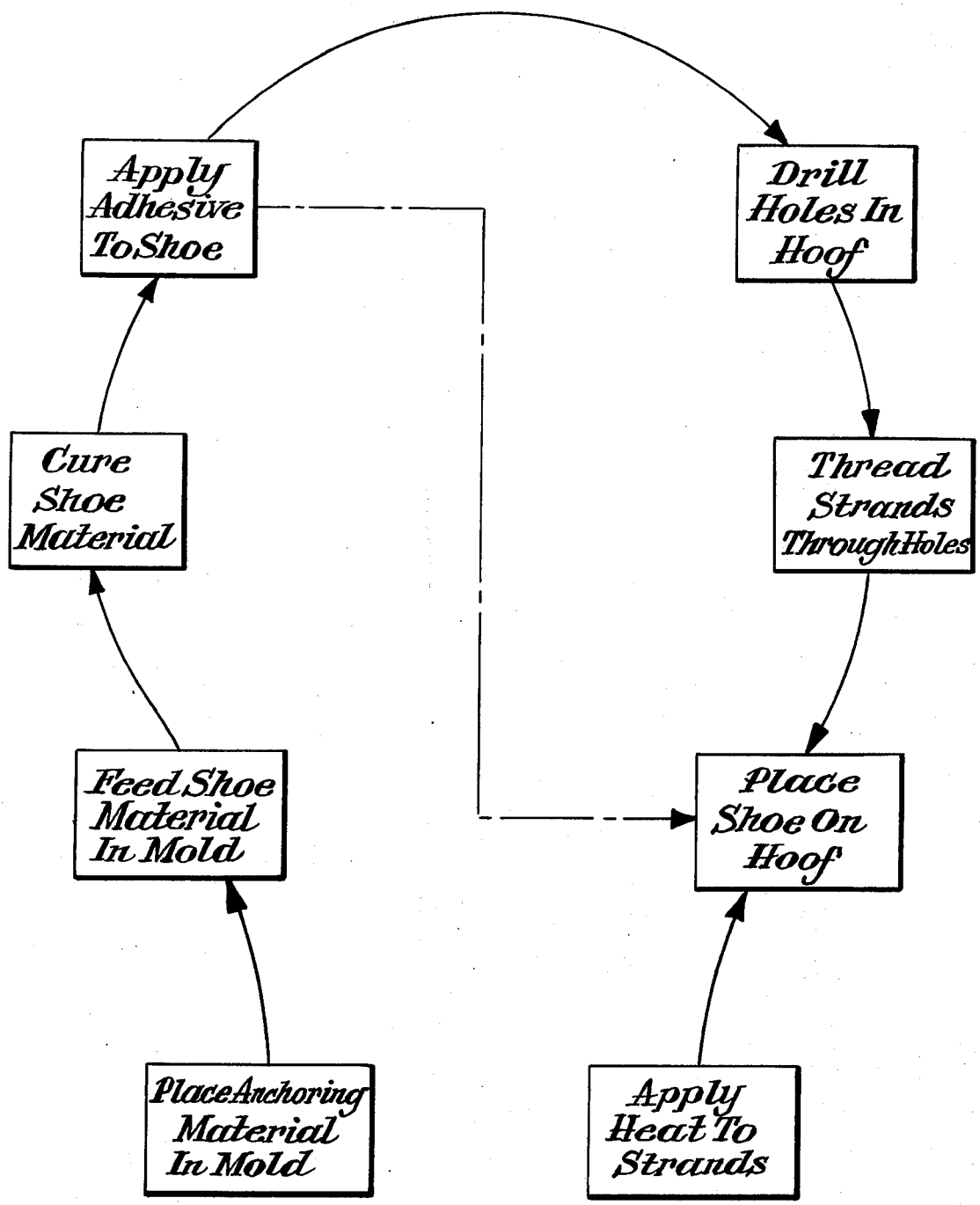
FIG. 8 is a block diagram showing the steps used in accordance with this invention.

As shown in FIG. 8 the shoe is made by first placing the pads 24, 26 in a mold and then placing the plastic shoe material therein in contact with the pads so that the projections 24a, 26a become embedded within the plastic material. As previously noted, the pads 24 and 26 may be formed integrally from a single sheet member. In such case the sheet member is stretched over a mold of the hoof and the mold carrying sheet member is placed in contact with the plastic shoe material in its mold. The plastic shoe material is then cured thereby forming an integral unit between the pads and shoe element. Next the adhesive is spread over the shoe element and firmly secured thereto by the utilization of loops or hooks 24b, 26b as effective anchoring means. The finished shoes are then stored or may be sold in kits with the strand material for ultimate use by the farrier. If desired the adhesive may also be included in the kit for application by the farrier immediately prior to use.

For application of the shoe to the hoof, the farrier first readies the horse by drilling or otherwise forming a plurality of angular holes 30 around the edge of the hoof in a U-shaped pattern. Thus one end of the hole is at the side of the hoof while the other end is at the lower surface thereof. Although holes are formed in the hoof, the holes are made in a manner unlike conventional shoeing techniques. In this respect with conventional shoeing techniques wherein the shoe is nailed straight into the hoof there is always a danger that a nail will penetrate too deeply and cause injury to the horse. Holes 30, however, in accordance with this invention are of a small size and are of controlled depth and are angularly arranged so that there is no danger of injury to the horse.

As later described, in accordance with this invention elongated strands are threaded through the holes 30 of the hoof. In accordance with one aspect of this invention the farrier may form a groove 31 along the side of the hoof to accommodate the elongated strand so that the wall portion 20 will be flush with the hoof.

Figure 1:
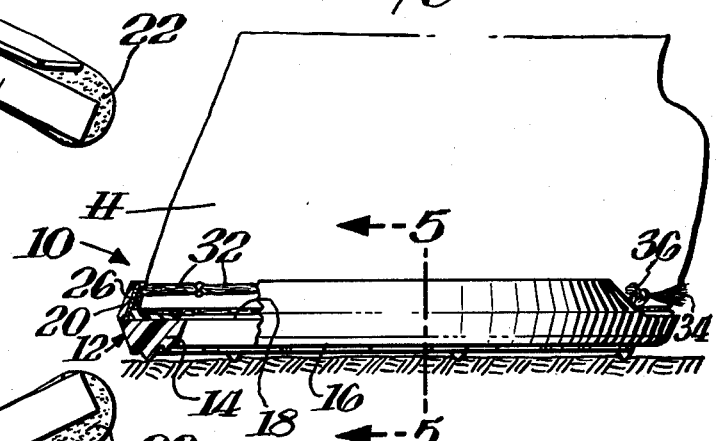
FIG. 1 is a side view in elevation partly in section of a horseshoe assembly mounted on the hoof in accordance with this invention.

Horseshoe assembly 10 further includes elongated strands 32. Each strand is composed of a plurality of individual filaments which may be twisted together or may be parallel to form a tow. The strands may be knit, woven or twisted ferrous or non-ferrous metallic wire. For example where a thermo-adhesive is used the strands are advantageously made of stainless steel so as to be heat conductive; where, however, a room temperature curing adhesive is used the strands need not be heat conductive. Other suitable strand materials include strings, laces or tapes as well as rope, twine or cordage and the material may be natural or synthetic fibers. One or more of such strands are threaded or woven through holes 30 in the horse's hoof with the free ends 34 of the strands being knotted together at 36 and extending beyond the hoof and beyond the shoe element 12, as illustrated for example in FIGS. 1 and 2. As illustrated in FIGS. 6–7, in accordance with a further aspect of this invention the strand materials advantageously serve as a temporary clamp while the adhesive 28 cures. In this respect the free ends 34, 34 may be looped over the end of the shoe element 12 and then knotted. As a further alternative wall 20 may extend a sufficient distance to shield the knotted ends, rather than leave them exposed as shown in FIGS. 6–7. After the adhesive has cured the loop may be cut if desired. Where a non-thermo-adhesive is used the strand material may be selected in accordance with the particular type of adhesive so that the adhesive will work its way into the strand material and be firmly secured thereto as well as or instead of being secured to the hoof. If desired where a quick setting adhesive is used, the hoof H may be elevated and the shoe pressed against it for a sufficient time such as a few minutes to effect a complete cure.

It is to be understood that the invention may be practiced wherein the strands are simply one elongated strand or conversely a plurality of short strands disposed at discrete portions along the shoe, such as at the ends thereof and/or at the bight.

In accordance with one aspect of this invention a thermo-adhesive is used in conjunction with heat conductive strands. Heat application means 38 of any suitable type, such as disclosed in the parent applications, are then applied to the heat conductive and electrically conductive strands 32 by, for example, being clipped to the free ends 34 thereof. Thus, for example, such heat application means 38 could be applied to both sets of free ends 34 so as to complete an electrical circuit which causes the strands 32 to heat and since the strands are in intimate contact with the thermo-adhesive means 28 the thermo-adhesive means quickly melts and flows through the strands as well as contacting the hoof itself thus assuring a quick mounting in a very short period of time of the shoe to the hoof.

An advantageous feature of this invention is the use of minimal metal in the shoe assembly, since for example in the preferred form only the strands are formed of metal and the strands need not be of metal when a non-thermo-adhesive is used. The strands, need not be precisely formed and has as their main criteria that they be heat conductive and of sufficient length so as to effect in complete curing or melting of the adhesive when a thermo-adhesive is used. The strands, of course, should also have sufficient strength to be able to be threaded through the hoof without breaking. It is also advantageous that they have sufficient strength to withstand the forces applied to the shoe during normal usage so as to assist the adhesive in maintaining the shoe secured to the hoof. Where a sufficiently strong adhesive is used the adhesive, once cured, may alone function in securing the shoe to the hoof by its contact with the hoof. In such case the strands function to temporarily mount the shoe until the hoof has cured.

Where the strands are to be used in completing an electrical circuit, they should of course be electrically conductive. Where, however, other heat application means are used, such as disclosed in parent application Ser. No. 252,545, it is only necessary that the strands be heat conductive. In the broadest aspect of this invention it is not necessary that the strands be of continuous length extending completely around the hoof. If desired, short strands may be threaded through sets of holes so as to dispose the strands at discrete locations along the hoof or only at a single location on the hoof.

In accordance with a further aspect of this invention, since the shoes may be worn for long periods of time and even months, removable inserts or replaceable clips may be applied to the wear surface for adaptability with various conditions, such as mud or snow, rather than necessitating complete shoe replacement.

What is claimed is:

1. A horseshoe assembly comprising a shoe element, said shoe element having a body member with a lower wear surface and an upper securing surface, said shoe element being generally U-shaped, adhesive means on said shoe element, hoof-threading means for being threaded through holes in a hoof of a horse, and said hoof-threading means including elongated strands for being in direct contact with said adhesive means over an area substantially less than the area of said upper securing surface and extending away from said shoe element toward the hoof to thereby secure said assembly to the hoof.

2. An assembly as set forth in claim 1 including pad means secured to said upper securing surface on one side thereof and secured to said adhesive means on the other side thereof, and said pad means including an impermeable layer preventing direct contact of said adhesive means with said shoe element through said impermeable layer.

3. An assembly as set forth in claim 1 wherein said shoe element has upstanding wall portions extending from said bottom member for being disposed above the lower surface of the horse's hoof, and said adhesive means being on at least one of said upper securing surface of said bottom member and the inner surface of, said wall portions.

4. An assembly as set forth in claim 3 wherein said U-shaped shoe element has a pair of free ends and said strands extending beyond said free ends of said shoe element.

5. An assembly as set forth in claim 4 wherein said strands are heat conductive and said adhesive means is a thermo-adhesive.

6. An assembly as set forth in claim 4 wherein said strands are non-ferrous and said adhesive means is a non-thermo-adhesive.

7. An assembly as set forth in claim 3 wherein said strands are disposed against said upper securing surface of said bottom member.

8. An assembly as set forth in claim 3 wherein said strands are disposed against said upstanding wall portions of said shoe element.

9. An assembly as set forth in claim 3 wherein pad means are integrally secured to the shoe element for anchoring the adhesive means thereto, said pad means comprising an impermeable layer having securing means on one side thereof in integral engagement with said shoe element.

10. An assembly as set forth in claim 9 wherein said pad means includes projections on each side of said impermeable layer, said projections on one side of said layer being embedded in said shoe element for comprising said securing means.

11. An assembly as set forth in claim 10 wherein said strands are disposed against said upper securing surface of said bottom member, and said pad means being disposed on said upper securing surface of said bottom member.

12. An assembly as set forth in claim 10 wherein said strands are disposed against said wall portions of said shoe element, and said pad means being disposed on said wall portions of said shoe element.

13. An assembly as set forth in claim 12 wherein said strands are also disposed against said upper securing surface of said bottom member, and said pad means also being disposed on said upper securing surface of said bottom member for engagement with said strands.

14. An assembly as set forth in claim 13 wherein said pad means comprises an integral sheet member integrally secured to both said bottom member and said wall portions.

15. An assembly as set forth in claim 13 wherein said pad means include spaced pads.

16. An assembly as set forth in claim 13 wherein said pad means include a continuous U-shaped pad extending substantially the entire length of said shoe element.

17. A horseshoe assembly comprising a shoe element, said shoe element having a body member with a lower wear surface and an upper securing surface, said shoe element being generally U-shaped, said shoe element being made of a plastic material, pad means connected to said upper securing surface of said shoe element, adhesive means secured to said pad means on the side thereof remote from said shoe element for securing said assembly to the hoof, and said pad means including an impermeable sheet which comprises barrier means for preventing said adhesive from contacting said shoe element directly through said pad means.

18. An assembly as set forth in claim 17 wherein said sheet has a mechanically irregular surface on at least one side thereof to provide projections thereon.

19. An assembly as set forth in claim 18 wherein said projections are on the side of said sheet remote from said shoe element, and said adhesive means being secured to said projections.

20. An assembly as set forth in claim 18 wherein said projections are on the side of said sheet remote from said adhesive means, and said projections being secured to said upper securing surface of said shoe element.

21. An assembly as set forth in claim 20 wherein said projections are further disposed on the side of said sheet remote from said shoe element, and said adhesive means being secured to said further porjections.

22. An assembly as set forth in claim 21 including elongated strands secured to said adhesive means.

23. An assembly as set forth in claim 17 wherein said sheet is leather.

24. An assembly as set forth in claim 17 including elongated strands secured to said adhesive means.

25. An assembly as set forth in claim 17 wherein said shoe element has upstanding wall portions extending from said body member, and said pad means being disposed on said wall portions of shoe element.

26. An assembly in claim 17 wherein said pad means are disposed against said upper securing surface of said body member.

27. An assembly as set forth in claim 17 including elongated strands threaded through holes in the hoof of a horse and being in direct contact with said adhesive means.

28. An assembly as set forth in claim 27 wherein said strands are heat conductive and said adhesive is a thermo-adhesive whereby the application of heat to said strands causes said thermo-adhesive to melt and to thereby secure said assembly to the hoof of the horse.

29. A method of mounting a horseshoe on the hoof of the horse comprising providing adhesive means on a U-shaped shoe element, forming a plurality of holes completely through the hoof of the horse with the holes being in a U-shaped pattern around the edge of the hoof, threading elongated strands through the holes in the hoof, placing the shoe element against the hoof with the strands in contact with the adhesive means, and curing the adhesive means to thereby secure the shoe element to the hoof.

30. The method of claim 29 wherein the adhesive means are thermo-adhesive and the strands are heat conductive and including the step of applying heat to the strands to cause the thermo-adhesive means to melt.

31. The method of claim 29 including threading the strands through the holes in such a manner that the free ends of the strands extend beyond the shoe element and the hoof, and looping the extending free ends of the strand around the shoe element to form a temporary clamp.

32. The method of claim 29 including forming a groove around the hoof to accommodate the strands and disposing the strands in the groove so that the shoe element is flush with the hoof.

* * * * *